3,067,245
2,5-DIALKYL-2,5-DIPHENYL-ADIPIC ACID
Stanley P. Rowland, Cincinnati, Ohio, assignor to National Distillers and Chemical Corporation, New York, N.Y., a corporation of Virginia
No Drawing. Filed Mar. 25, 1960, Ser. No. 17,485
2 Claims. (Cl. 260—515)

This invention relates to novel alkyl-substituted diphenyladipic acids devoid of hydrogen in the alpha position, i.e., 2,5-dialkyl-2,5-diphenyladipic acids, esters thereof, and compositions containing same.

The 2,5-dialkyl-2,5-diphenyladipic acids of this invention may, for illustration, be prepared by processes such as are described in copending applicaiton Serial No. 702,765 (filed December 16, 1957, now U.S. Patent No. 2,956,086) and in U.S. Patent No. 2,816,913. By use of such processes, alpha-methylstyrene, for example, may be selectively dimerized in the presence of metallic sodium to yield disodio-derivatives which may subsequently be carbonated to yield ultimately as product substantially pure 2,5-dimethyl-2,5-diphenyladipic acid. More specifically, according to such a process, alpha-methylstyrene is reacted with a finely dispersed alkali metal, such as sodium, potassium, or lithium, in a reaction medium which consists substantially of an ether selected from the group consisting of aliphatic monoethers having a methoxy group and an oxygen to carbon ratio of not less than about 1:4 and polyethers derived from an aliphatic polyhydric alcohol having all of the hydroxyl hydrogen atoms replaced by alkyl groups and mixtures thereof, preferably in the presence of a relatively small amount (e.g., about 0.1 to about 10 weight percent based on the amount of the alpha-methylstyrene) of a polycyclic aromatic compound, e.g., diphenyl, the terphenyls, dinaphthyl, and the like, or mixtures of these. The reaction temperature is preferably below about 0° C., and the preferred temperature range is between about —20° and —75° C., whereby there is produced a mixture of dialkali metal dimers of the alpha-methylstyrene which is then carbonated, for example, with dry gaseous carbon dioxide or solid carbon dioxide, at a temperature below about 0° C. The salts thus formed contain two more carbon atoms than the dimetallic dimers from which they are produced; they are then acidified, for example with concentrated hydrochloric acid, to yield the 2,5-dimethyl-2,5-diphenyladipic acid.

The 2,5-dialkyl-2,5-diphenyladipic acids embodied herein constitute novel chemical compounds. They can be used as chemical intermediates and in the preparation of polyesters, polyamides, alkyd resins, plasticizers, and synthetic lubricants. The diacids themselves possess excellent thermal stability and, when used for the preparation of substances such as polyesters and polyamides, provide such substances which have unexpected desirable properties resulting from the use of 2,5-dialkyl-2,5-diphenyladipic acids.

The invention will be described in greater detail for illustrative purposes by the following examples in which all parts are expressed by weight unless otherwise specified.

EXAMPLE 1

To a stainless steel reactor equipped with a Dry-Ice condenser, low-temperature thermometer, a monomer addition port, a nitrogen purge system, and a mechanical stirrer terminating with a three-inch turbine was added three liters of a 1:1 (volume ratio) odorless mineral spirits-dimethyl ether mixture. A charge of two grams of naphthalene was followed by the addition of 1.1 g. atom of sodium (average particle size 1–2µ) dispersed in odorless mineral spirits. Commercial grade α-methylstyrene (1.0 mole) diluted 1:1 by volume with odorless mineral spirits was added at a controlled rate of one gram per minute (118 minutes). A stirring speed of 900 r.p.m. and a reaction temperature of —32° C. were maintained throughout the reaction.

After the monomer addition was completed, the contents of the reactor was poured directly onto a large excess amount of Dry Ice to carbonate the disodio-dimethyldiphenylhexane. The dimethyl ether solvent was evaporated, and the remaining odorless mineral spirits-sodium salts slurry was quenched with steam. Insoluble polymer products were removed, and the organic layer separated from the aqueous layer.

The aqueous sodium salt solution was acidified with concentrated HCl in the presence of hot (60–80° C.) benzene (170 gms. per 100 gms. total acids) using gentle agitation. After complete acidification, the hot mixture was stirred for fifteen minutes and then filtered. The precipitate was washed with a small amount of benzene to remove any residual polymer acids and then thoroughly with hot water to remove any inorganic salts.

After vacuum drying, the 2,5-dimethyl-2,5-diphenyladipic acid was obtained in 79% yield (neutral equivalent 164.5, theoretical 163; M.P. 190–214° C.).

By the aforesaid procedure, use of ethylstyrene instead of α-methylstyrene produces 2,5-diethyl-2,5-diphenyladipic acid, and use of propylstyrene instead of α-methylstyrene produces 2,5-dipropyl-2,5-diphenyladipic acid. Use of still other alkyl-substituted styrenes produces the corresponding 2,5-dialkyl-2,5-diphenyladipic acid.

The properties of the 2,5-dimethyl-2,5-diphenyladipic acid thus produced were compared with those of 2,5-diphenyladipic acid. For example, thermal stability was determined by heating the compound in a nitrogen atmosphere for 155 minutes at 300° C., decomposition being measured by carbon dioxide evolution and by acid titration loss. The effect of added tetrabutyl titanate polyesterification catalyst was measured under the same conditions. Results are tabulated as follows:

Table I

| Acid | $(BuO)_4Ti$ added, percent | $CO_2$ evolved, mole percent | Acid No. loss, percent |
|---|---|---|---|
| 2,5-dimethyl-2,5-diphenyladipic acid | 0 | 5.2 | 4.5 |
| | 0.28 | 5.1 | 3.6 |
| 2,5-diphenyladipic acid | 0 | 14.8 | 10.8 |
| | 0.14 | 88.2 | 88.0 |
| | 1.0 | 93.5 | 97.0 |

As is evident from the data in Table I, the novel compound of this invention devoid of hydrogen in the alpha position possesses an unexpected, marked improvement in thermal stability over the unsubstituted 2,5-diphenyladipic acid.

The following example shows the superiority of 2,5-methyl-2,5-diphenyladipic acid over 2,5-diphenyladipic acid in polyester formation.

EXAMPLE 2

A polyester was prepared by reacting 2,5-dimethyl-2,5-diphenyladipic acid with ethylene glycol and 0.1 percent p-toluenesulfonic acid plus 0.1 percent tetrabutyl-titanate catalysts at 200° C.

The polyester had a high solution viscosity (46.0 poises, 50 percent in xylene at 25° C.) and was cold-drawable.

A polyester prepared in the same manner but using 2,5-diphenyladipic acid instead of 2,5-dimethyl-2,5-diphenyladipic acid had a low solution viscosity (3.4 poises, 50 percent in xylene at 25° C.) and was quite brittle.

The following example is included to contrast the stability of polyamides prepared from 2,5-dimethyl-2,5-diphenyladipic acid with that of similarly prepared polyamides from 2,5-diphenyladipic acid.

EXAMPLE 3

A polyamide was prepared by reacting 2,5-dimethyl-2,5-diphenyladipic acid with hexamethylenediamine at 300° C. By measuring gas evolution, a stable polyamide was obtained after reaction for about thirty minutes. The polyamide obtained by use of 2,5-diphenyladipic acid was less stable, exhibiting some decomposition.

The use of 2,5-dimethyl-2,5-diphenyladipic acid in the preparation of ester plasticizers and of lubricants is demonstrated in the following examples which also include data showing the superior properties possessed by esters of 2,5-dimethyl-2,5-diphenyladipic acid. Although for this purpose the dioctyl esters have been used, the invention also embodies other dialkyl esters and particularly such esters prepared by using for the esterification aliphatic monoalcohols of from about 4 to 10 carbon atoms.

EXAMPLE 4

A dioctyl ester of 2,5-dimethyl-2,5-diphenyladipic acid was prepared by refluxing 325 parts of the acid with an equal weight of 2l-ethylhexanol (16% excess) in the presence of 0.5 part tetraisopropyltitanate as catalyst, the reaction temperature increasing from 180° to 230° C. over a 3-hour period, after which the acid number was 0.17. The ester was alkali-refined to an acid number of 0.04 and 30 parts of the ester were then compounded with 100 parts of Geon 107 (a B. F. Goodrich Chemical Co. polyvinyl chloride resin). The properties of the plasticized stock were compared with those of Geon 101 plasticized with dioctyl 2,5-diphenyadipate. Results are tabulated below.

Table II

| Plasticizer | Amount per 100 parts of Geon 101 | Softening point, °C. | Tensile impact, p.s.i. | Heat Stability, 177° C. | Viscosity of ester alone, poise, 25° C. |
|---|---|---|---|---|---|
| Dioctyl 2,5-dimethyl-2,5-diphenyladipate | 30 | 142 | 106 | Good | 2.1 |
| Dioctyl 2,5-diphenyl-adipate | 30 | 138 | 103 | Fair | 1.12 |

EXAMPLE 5

Dioctyl 2,5-dimethyl-2,5-diphenyladipate, prepared as in Example 4, was tested as a lubricant for jet engines in accordance with military specification MIL-L-7808C, whereby a sample of the ester was heated in a glass tube for 72 hours at 347° F. while blowing with air at the rate of 5 liters per hour. During the test, squares of the following metals were immersed in the lubricant: copper, silver, steel, aluminum alloy, and magnesium alloy. Test results were compared with those for dioctyl 2,5-diphenyladipate and are summarized in Table III.

Table III

| Test | MIL-L-7808C requirement | Dioctyl 2,5-dimethyl-2,5-diphenyl-adipate | Dioctyl 2,5-diphenyl-adipate |
|---|---|---|---|
| Viscosity at 100° C. | Maximum change −5 to +15 percent. | | |
| Initial | | 177.6 | 99.7 |
| Final | | 185.6 | 113.8 |
| Increase (percent) | | 4.5 | 14 |
| Acid No. | Maximum after test=2. | | |
| Initial | | 0.2 | 0.17 |
| Final | | 0.38 | 4.25 |
| | | Passed | Failed |

While there are above disclosed but a limited number of embodiments of the process of the invention herein presented, it is possible to produce still other embodiments without departing from the inventive concept herein disclosed. It is desired therefore that only such limitations be imposed on the appended claims as are stated therein.

What is claimed is:
1. 2,5-dialkyl-2,5-diphenyladipic acids, in which the alkyl group has 1 to 4 carbon atoms.
2. 2,5-dimethyl-2,5-diphenyladipic acid.

References Cited in the file of this patent

UNITED STATES PATENTS

| | | |
|---|---|---|
| 2,617,820 | Gamrath et al. | Nov. 11, 1952 |
| 2,667,504 | Dazzi | Jan. 26, 1954 |
| 2,789,101 | Wilson | Apr. 16, 1957 |
| 2,802,802 | Reid | Aug. 13, 1957 |
| 2,817,680 | Yen | Dec. 24, 1957 |
| 2,834,804 | Lecher | May 13, 1958 |